United States Patent [19]
Spears et al.

[11] Patent Number: 5,684,644
[45] Date of Patent: Nov. 4, 1997

[54] VARIABLE-LENGTH LINE PROJECTING OPTICS

[75] Inventors: Steven William Spears, Sherwood; William Craig Burke, Little Rock, both of Ark.

[73] Assignee: Emerging Technologies, Inc., Little Rock, Ark.

[21] Appl. No.: 642,752

[22] Filed: May 3, 1996

[51] Int. Cl.[6] .................................................... G02B 7/02
[52] U.S. Cl. ........................ 359/823; 359/826; 359/829; 385/33; 385/119
[58] Field of Search .............................. 359/823, 826, 359/829, 830; 385/33, 34, 25, 119

[56] References Cited

U.S. PATENT DOCUMENTS

| | | | |
|---|---|---|---|
| 3,761,162 | 9/1973 | Hall | 359/829 |
| 4,210,387 | 7/1980 | Ogawa | 359/823 |
| 4,905,690 | 3/1990 | Ohshiro et al. | 607/89 |
| 5,016,964 | 5/1991 | Donnelly | 385/119 |
| 5,191,879 | 3/1993 | Krauter | 359/823 |
| 5,255,115 | 10/1993 | Kikuchi | 359/209 |
| 5,331,343 | 7/1994 | Ono et al. | 347/257 |
| 5,381,272 | 1/1995 | Kato et al. | 359/823 |
| 5,463,707 | 10/1995 | Nakata et al. | 385/34 |
| 5,528,432 | 6/1996 | Donahoo | 359/823 |
| 5,594,589 | 1/1997 | Chen | 359/826 |

*Primary Examiner*—Loha Ben
*Attorney, Agent, or Firm*—Ray F. Cox, Jr.

[57] ABSTRACT

A light beam line projecting device having a combination of two or more lenses which magnify in only one dimension; i.e., cylindrical and plano-cylindrical lenses, which are arranged so that the lenses' physical proximity to one another can be manipulated in order to dictate the angle of light emitted from the lens system. The axes of curvature of the respective lenses are maintained in the same plane by a lens holder comprising a stationary lens holder which houses one of the lenses, a sliding lens holder which houses the other lens, and a rotating adjustment ring which provides both the outside housing for the system and the means of adjustment of the proximity of the lenses relative to each other. The sliding lens holder has projections that slide longitudinally in grooves in the stationary lens holder and projection that slide circumferentially in grooves in the rotating adjustment ring. An additional embodiment of the invention allows the lens combination and holder to be attached to a light source in such a manner as to be infinitely rotatable or locked into position. This allows projection of the line image at a particular angle of rotation. A further embodiment of the present invention provides for adjusting the focus of the light beam so as to alter the width of the projected line.

6 Claims, 6 Drawing Sheets

VARIABLE-LENGTH LINE PROJECTING OPTICS

BACKGROUND OF THE INVENTION

The present invention relates to light beam projecting optics, and in particular, to a combination of cylindrical lenses capable of projecting a laser light beam as a line of variable length by altering the distance between pairs of cylindrical lenses oriented with their respective axes of curvature in the same plane. Aspects of the present invention involve means to manipulate combinations of lenses to produce lines of variable length and width, and to lens holders for maintaining the relative orientation between pairs of cylindrical lens while varying the distance therebetween.

Various lenses and optical systems, such as cylindrical, half-cylindrical and plano-cylindrical lenses, binary optics, and refractive optics are known to be useful in applications requiring magnification in one dimension only. As used herein, the term "cylindrical lenses" refers to all such lenses or optical systems capable of magnifying a light beam or image in one dimension only. Such lenses are therefore characterized by a non-symmetrical magnification defined by an axis of curvature and an associated radius of curvature.

Such lenses have been employed in applications where a point image must be transformed into a line image. By using a cylindrical lens or a plano-cylindrical lens, a point image; e.g., a projection from a laser, may be transformed into a line of fixed length when projected at a given distance. (Alternatively, the projection may be regarded as being at a given angle of dispersion from the lens.)

A projection known to be at a particular angle of dispersion and therefore known to produce a particular length line image when projected at a given distance is useful in a number of applications where a visible indicator (laser dot or line) is needed for alignment, positioning, placement, straightness, or as a reference guideline. Such uses may be found in the automotive, aerospace, manufacturing, industrial, construction, assembly and installation industries. Particular applications include: machinery alignment, equipment alignment, material placement, shaft alignment, parts placement, tool placement, point of drilling, cutting, welding or riveting indicators, conveyor alignment, movement indication, equipment placement indication, or straightness indication.

In the prior art of projecting a light beam at a particular angle to produce a given line length, a particular single lens is required for each particular angle or line length, thus necessitating a separate lens for each application. It is therefore desirable to be able to have means to adjust the angle of dispersion of a light beam so as to be able to produce any desired angle or length of projected line without changing lenses or the distance between the light projector and the surface the beam is projected onto.

It is known to use a pair of cylindrical lenses to couple a laser beam having a particular cross section to a plurality of optical fibers. U.S. Pat. No. 5,016,964 for "Optical Fiber Coupler with Linear Input" issued to Donnelly on May 21, 1991 discloses such an apparatus in which a first cylindrical lens is used to control the length of the laser beam to match the length of the optical fiber array and a second cylindrical lens is used to focus the laser beam into a line. The length of the focused laser line is adjusted by adjusting the distance between the pair of cylindrical lenses. The two cylindrical lenses in this application must be oriented so that the axes of curvature of the two lenses are at right angles to each other.

Donnelly does not address the problem of altering the line length of the focused laser beam by readjusting the distance between the two cylindrical lenses. Since cylindrical and plano-cylindrical lens magnify in one direction only, the placement and adjustment of cylindrical lenses present a problem that is not found with the use of symmetrical lenses. When cylindrical lenses are adjusted so as to alter the optical relationship with other lenses, the relative rotational orientation must be maintained if the same optical properties of the lens combination are to be maintained.

For example, U.S. Pat. No. 5,331,343 for "Optical Apparatus with Improved Lens Mounting Device" issued to Ono et al. on Jul. 19, 1994 discloses an optical apparatus in which a cylindrical lens is mounted in a lens holder for rotational and axial adjustment. The lens holder is provided with projections which are received in a groove and which allows some degree of axial and rotational motion.

U.S. Pat. No. 5,255,115 issued to Kikuchi on Oct. 19, 1993 for "Optical Scanning Apparatus and Recording Apparatus Using the Same" and U.S. Pat. No. 4,905,690 issued to Ohshiro et al. on Mar. 6, 1990 for "Semiconductor Laser Treatment Device" also disclose cylindrical lens holders having a limited degree of adjustability.

SUMMARY OF THE INVENTION

The present invention provides for a combination of two or more lenses which magnify in only one dimension; i.e., cylindrical and plano-cylindrical lenses, which are arranged so that the lenses' physical proximity to one another can be manipulated in order to dictate the angle of light emitted from the lens system. In order to adjust the physical proximity of the two lenses without altering the optical properties of the lens combination, the lenses must be arranged so that the axes of curvature of the respective lenses are in the same plane. This orientation must be maintained while the separation between the two lenses is adjusted.

Since the effect of the present invention requires that pairs of cylindrical lenses be arranged so that the physical proximity of the lenses to each other be changed without changing the rotational position of the radius of curvature of the lenses relative to each other, a particular lens holder is necessary to the practice of the invention.

An additional embodiment of the invention allows the lens combination and holder to be attached to a light source in such a manner as to be infinitely rotatable or locked into position. This allows projection of the line image at a particular angle of rotation. A further embodiment of the present invention provides for adjusting the focus of the light beam so as to alter the width, or thickness, of the projected line.

This invention allows the angle of projection of light from a light source to be changed in one dimension using a combination of two lenses which magnify in only one dimension. When light is projected at a specific angle in only one dimension at a surface a specific distance away the resulting image is a line pattern of specific length. Currently, the only way to change the angle projection of the light beam and thus the length of the resulting line image is to use a separate single-dimension magnifying lens for each desired angle of projection. This is costly and time consuming. With the present invention a single system of two or more single-dimension magnifying lenses are used to produce a range of angles of projection which in turn produce various lengths of projected line patterns from a stationary distance, thereby eliminating the need for separate lenses to produce lines of various lengths. By adjusting the lens system the desired length of line can be achieved at various distances. A major feature of this invention is the ability to change the angle of projection of a projected line allowing different length lines to be projected from a stationary distance or the same length line to be projected from various distances.

The design of the apparatus which contains the above lens system (the cylindrical lens holder) is designed in such a way to allow the proximity of the lenses to be changed without affecting the rotational position of the lenses relative to each other. It consists of the following items: a stationary lens holder which houses one of the lenses; a sliding lens holder which houses the other lens and allows the proximity of the two lenses to be changed without effecting the rotational position of the lenses relative to each other; and a rotating adjustment ring which provides both the outside housing for the system and the adjustment of the proximity of the lenses relative to each other. A unique design feature of this apparatus is the ability to control the proximity of two lenses relative to each other without changing the rotational position of either of the lenses. This is accomplished by providing a sliding lens holder having projections which slide in longitudinal grooves in the stationary lens holder and in circumferential grooves in the rotating adjustment ring. The rotating adjustment ring is threadedly received on the stationary lens holder so that rotation of the adjustment ring effects sliding motion of the sliding lens holder without rotation of the sliding lens holder. Furthermore, a focusing mechanism is disclosed which allows the projected light beam to be focused so as to adjust the thickness of the projected beam without causing misalignment problems between the light source, the focusing lens, and the cylindrical lenses. This is accomplished by preventing the focusing lens from rotating while the focus is adjusted. If the focusing lens is allowed to rotate during focusing, any misalignment will result in the rotation in a circular pattern of the projected beam.

It is thus an object of the present invention to eliminate the need for multiple lenses to produce different length lines.

It is a further object of the present invention to allow different length lines to be projected from one specific distance.

An additional object of the present invention is to allow a consistent length line to be projected from various distances.

Yet another object of the present invention is to provide a variable line length optical system that is convenient, cost effective, and time saving in operation.

A further object of the present invention is to provide the brightest possible projected line image.

It is also an object of the present invention to provide for adjusting the thickness of a projected line image and for rotating a line image, including locking the line image in a horizontal or vertical position.

An additional object of the present invention is to provide for a focusing mechanism that overcomes misalignment problems and allows the light beam to be focused without rotation of the projected beam.

Additional objects and advantages of the present invention will become apparent from a consideration of the detailed description of the preferred embodiments in conjunction with the drawings as described following:

DETAILED DESCRIPTION OF THE PREFERRED EMBODIMENTS

The preferred embodiments may now be described with reference to the drawings. The general arrangement of the preferred embodiment of the present invention may be described with reference to FIGS. 1, 2, 3, 4A and 4B. A main housing 10 encloses a battery 11 which is electrically connected through a switch 12 to a light source 13, which in the preferred embodiment is a laser diode. The main housing 10 is advantageously constructed of aluminum or similar material for use in demanding environments. When portability is not required, the power source may be line voltage rather than a battery. Electrically parallel with the battery 11, switch 12 and light source 13 is an indicator light 14 for indicating the on/off status of the device. At one end of the main housing 10, a battery access cap 16 is threadedly received into the main housing 10. The opposite end of the main housing 10 carries the focusing lens housing 20. The focusing lens housing 20 is affixed to the main housing 10 by means of screws 21. A focusing lens 22, which may comprise more than a single simple lens, is disposed in a sliding focusing lens holder 90 which slides within the focusing lens housing 20 so as to receive and focus light emitted from the light source 13. While the light source 13 in the preferred embodiment is a laser diode, various light sources may be effectively employed in the present invention, in particular any laser source with adjustable focus is acceptable.

Figure 1:
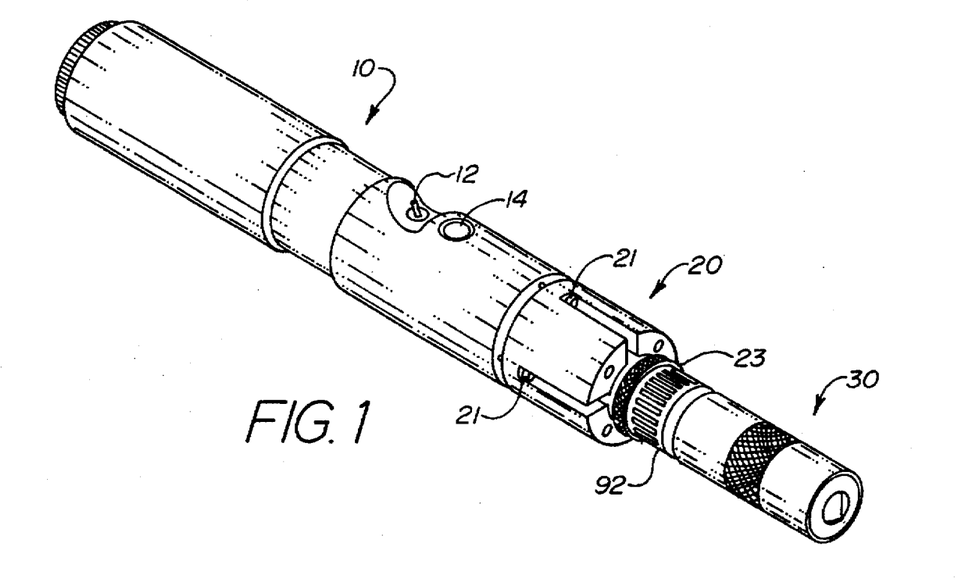
FIG. 1 is a perspective view of a laser beam line projector incorporating the variable-length line projecting optics of the present invention shown with the lens holder adjusted for a close configuration of the pair of cylindrical lenses.
Figure 2:
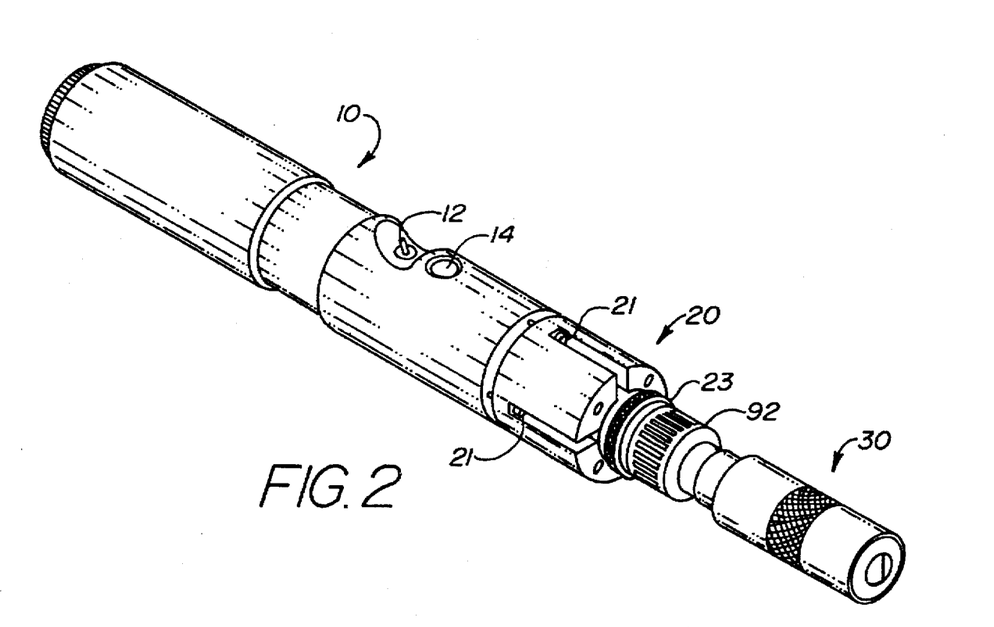
FIG. 2 is a perspective view of a laser beam line projector incorporating the variable-length line projecting optics of the present invention shown with the lens holder adjusted for a widely separated configuration of the pair of cylindrical lenses.
Figures 3, 4A, 4B:
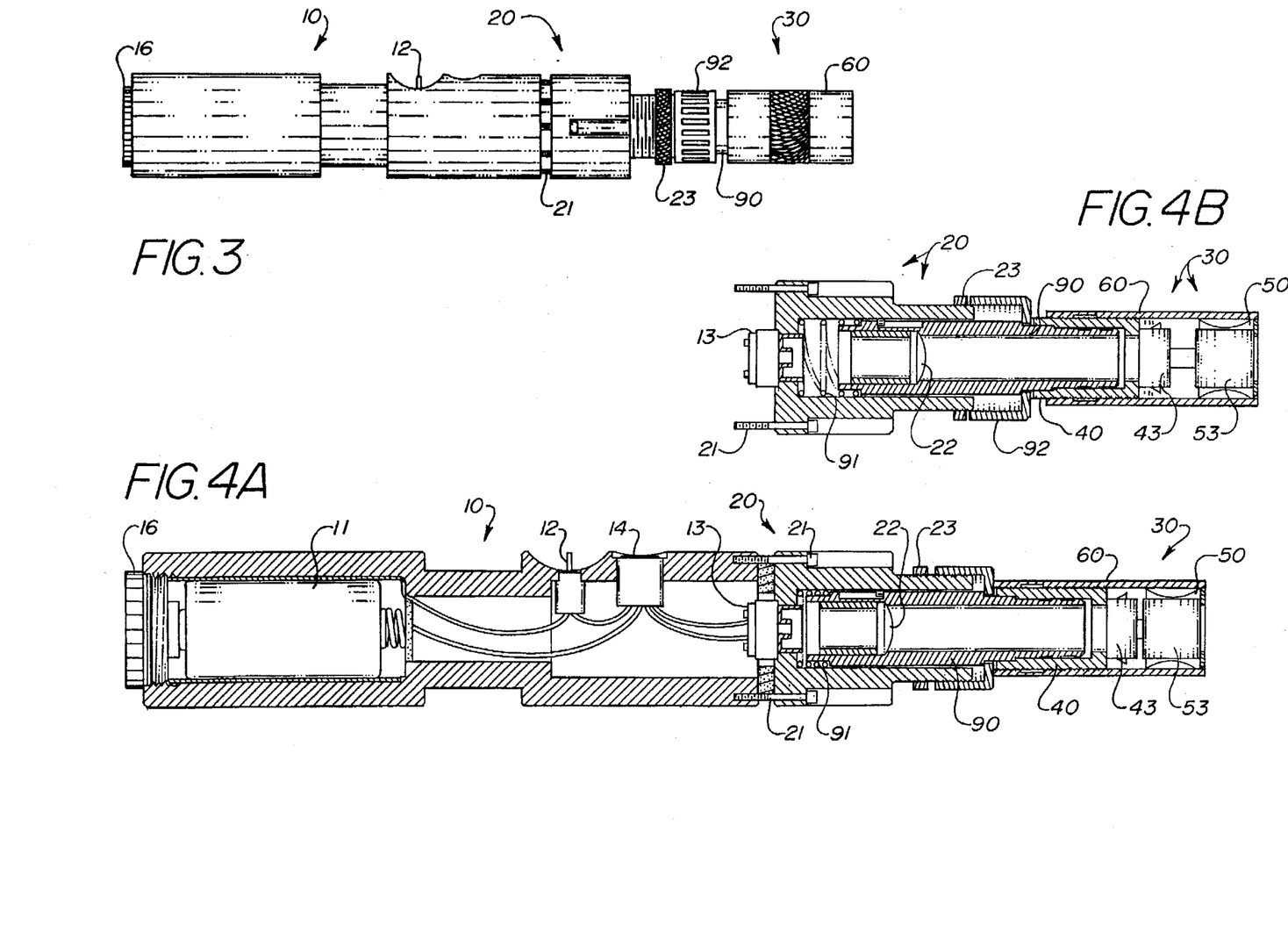
FIG. 3 is an elevational view of a laser beam line projector incorporating the variable-length line projecting optics of the present invention.
FIG. 4A is a sectional elevational view of the laser beam line projector incorporating the variable-length line projecting optics of the present invention and showing the focusing lens in proximity to the light source.
FIG. 4B is a partial sectional elevational view of the laser beam line projector incorporating the variable-length line projecting optics of the present invention and showing the focusing lens moved away from the light source.
Figure 5A:
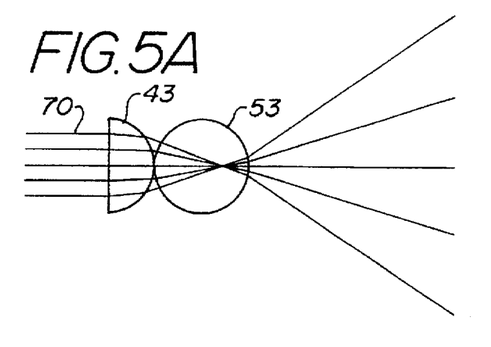
FIGS. 5A–5D are plan schematic views showing the effect, on a projected set of light rays, of varying the distance between a pair of cylindrical lenses arranged so that the respective radii of curvature are coplanar.
Figure 5B:
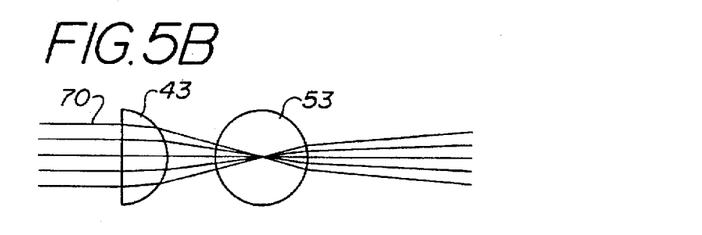
Figure 5C:
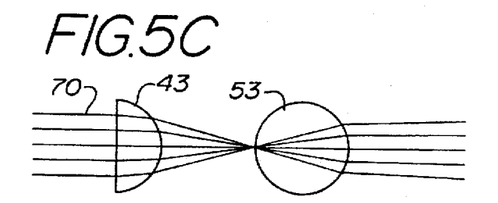
Figure 5D:
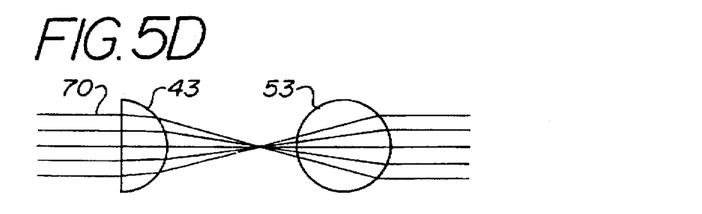

The sliding focusing lens holder 90 is biased by a spring 91 so that the sliding focusing lens holder 90 is normally biased away from the light source 13. The sliding focusing lens holder 90 moves longitudinally within the focusing lens housing 20 without rotation. Various means, such as complementary longitudinal grooves, may be used to assure that the sliding focusing lens holder 90 moves without rotation with respect to the focusing lens housing 20. A focus adjustment ring 92 is threadedly received on the focusing lens housing 20 and bears on the sliding focusing lens holder 90 so that when the focus adjustment ring is tightened onto the focusing lens housing 20, the sliding focusing lens holder 90 is forced toward the light source 13 against the action of the spring 91. Loosening the focus adjustment ring 92 has the opposite result. The focus adjustment ring 92 may be locked into position by the focus lock nut 23. Movement of the sliding focusing lens holder 90 relative to the light source 13 has the effect of adjusting the focus of the projected light beam and therefore the size of the projected beam. The effect is to adjust the width or thickness of the projected line formed by the device as described more fully below.

Figures 7, 8, 9:
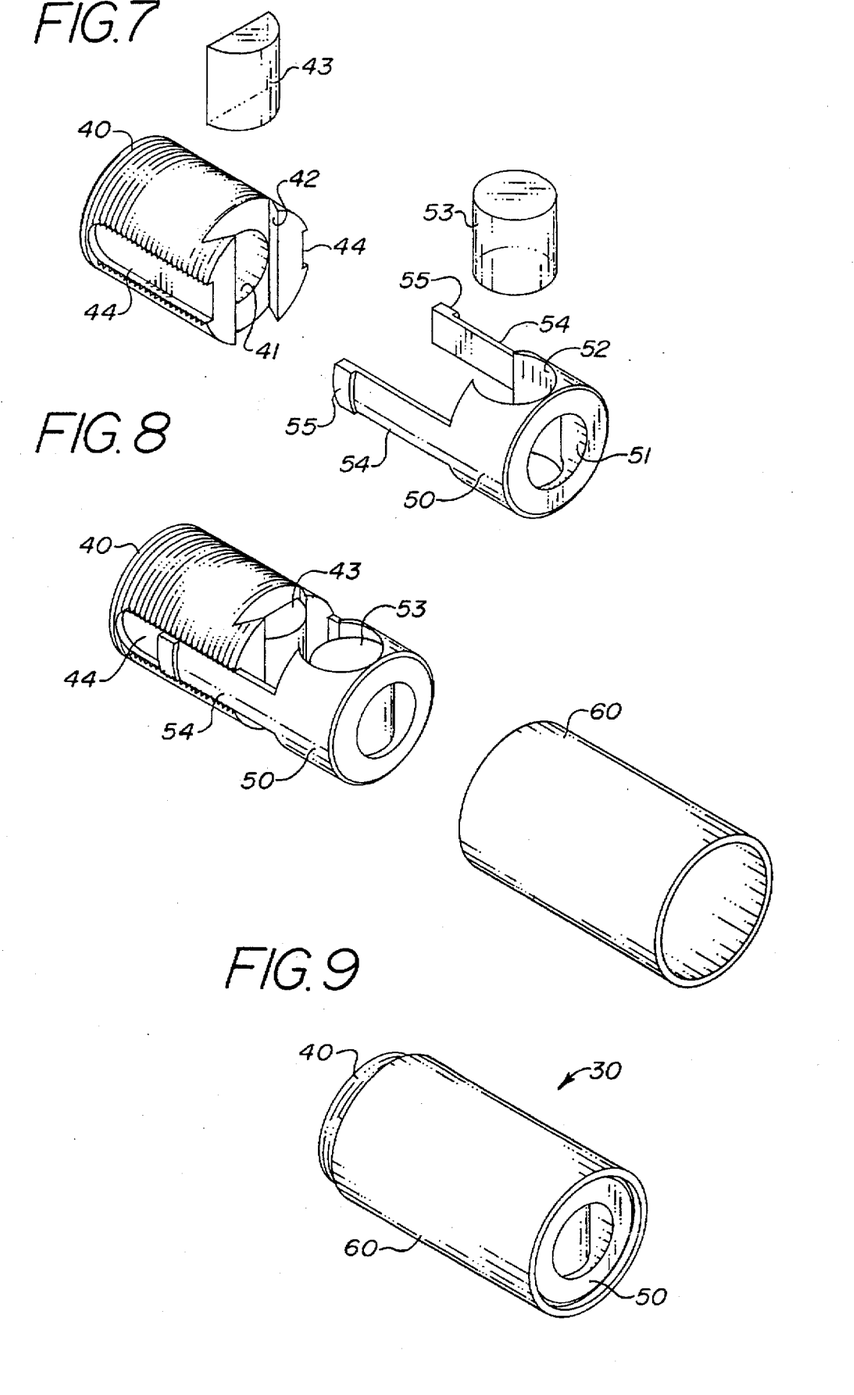
FIG. 7 is an exploded perspective view of the cylindrical lens holder for the variable-length line projecting optics of the present invention.
FIG. 8 is a perspective view of the assembled lens holder with the housing exploded from the lens holder.
FIG. 9 is a perspective view of the assembled lens holder and housing.

The cylindrical lens holder 30 is described with reference to FIGS. 7, 8, 9, 10A and 10B. The cylindrical lens holder 30 is affixed to the sliding focusing lens holder 90. With particular reference to FIG. 7, a stationary lens holder 40 is provided with a central bore 41 for the passage of a projected light beam. The stationary lens holder 40 is further provided with a transverse groove 42 for receiving a plano-cylindrical lens 43. The stationary lens holder 40 is also provided with a pair of longitudinal grooves 44.

A sliding lens holder 50 is likewise provided with a central bore 51 aligned with the central bore 41 of the stationary lens holder 40. A transverse bore 52 receives a cylindrical lens 53. The plano-cylindrical lens 43 and cylindrical lens 53 are aligned in the stationary lens holder 40 and sliding lens holder 50 respectively to allow the passage of a light beam generated by the light source 13 to pass through the plano-cylindrical lens 43 and cylindrical lens 53 consecutively.

The sliding lens holder 50 is provided with a pair of longitudinal projections 54 which are received in and slidingly engage the longitudinal grooves 44 of the stationary lens holder 40. The sliding lens holder 50 is therefore slidably adjustable with respect to the stationary lens holder 40 and therefore the cylindrical lens 53 is adjustable with respect to its distance from the plano-cylindrical lens 43.

The radii of curvature of the cylindrical lenses 43, 53 are both aligned in a vertical direction in FIG. 7. It is a significant aspect of the present invention that the radii of curvature of the lenses 43, 53 are at all times aligned in the same plane. This is accomplished by having the longitudinal projections 54 and the longitudinal grooves 44 located in a plane at right angles to the radii of curvature of the lenses 43, 53.

The assembly of the sliding lens holder 50 to the stationary lens holder 40 is shown in FIG. 8. The third major component of the cylindrical lens holder 30 is a rotating adjustment ring 60. The rotating adjustment ring 60 serves as the main housing and protection for the lenses 43, 53, stationary lens holder 40 and sliding lens holder 50. The rotating adjustment ring 60 is shown in exploded view in FIG. 8. The assembled cylindrical lens holder 30 is shown in FIG. 9.

Figure 10A:
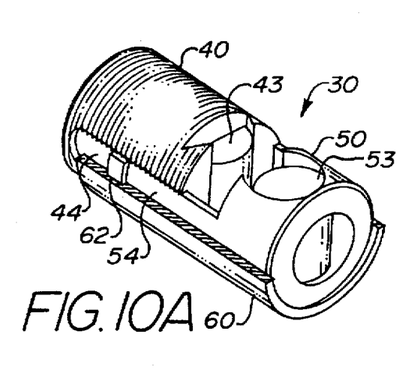
FIG. 10A is a sectional perspective view of the lens holder in a close configuration.
Figure 10B:
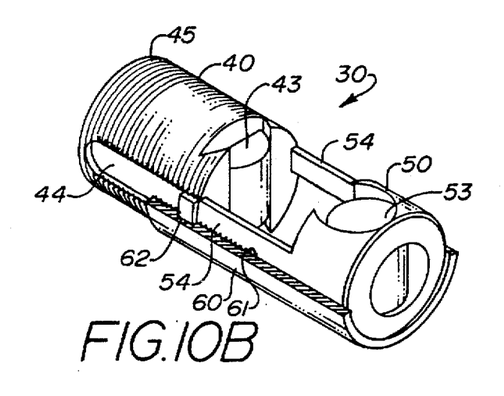
FIG. 10B is a sectional perspective view of the lens holder in an extended configuration.
Figures 11A, 11B:
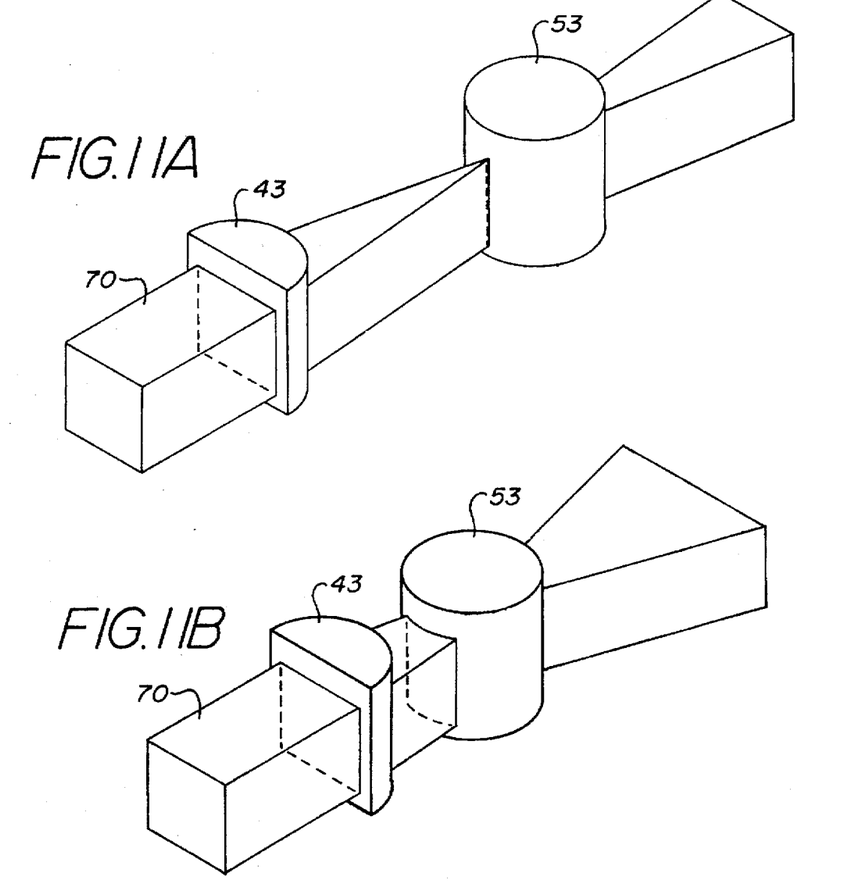
FIGS. 11A–11C are perspective schematic views of the pair of cylindrical lens in extended (FIG. 11A), intermediate (FIG. 11B), and close (FIG. 11C) configurations with the resulting narrow, intermediate, and wide dispersal of a projected light beam, respectively.
Figure 11C:
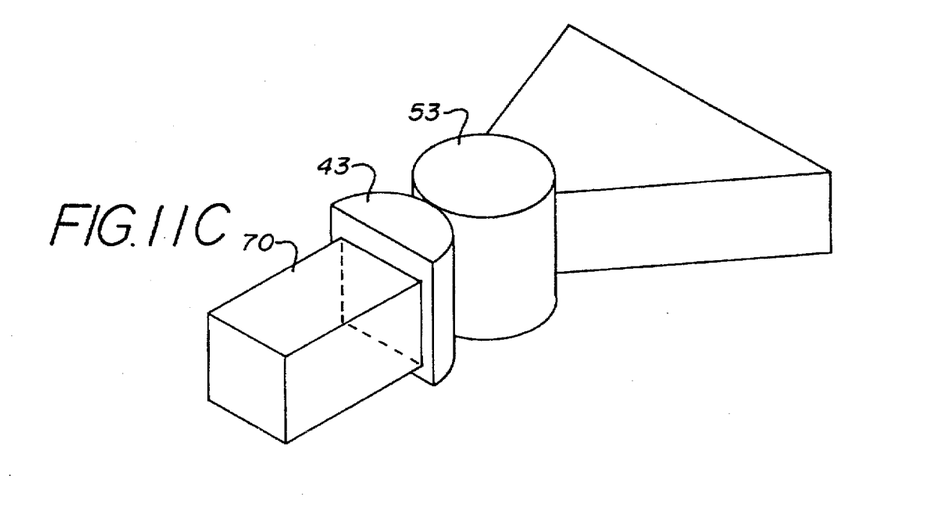

The manner in which the rotating adjustment ring 60 interacts with the stationary lens holder 40 and sliding lens holder 50 is described with reference to FIGS. 10A and 10B. The interior of the rotating adjustment ring 60 is provided with threads 61. The exterior of the stationary lens holder 40 is likewise provided with exterior threads 45 which threadedly receive the rotating adjustment ring 60. The interior of the rotating adjustment ring 60 is also provided with a circumferential groove 62. The circumferential groove 62 receives circumferential projections 55 on the sliding lens holder 50. The sliding lens holder 50 is thereby freely rotatable inside the rotating adjustment ring 60. Since the rotating adjustment ring 60 is threadedly received on the stationary lens holder 40, however, rotation of the rotating adjustment ring 60 causes relative longitudinal motion between the rotating adjustment ring 60 and stationary lens holder 40 by means of the interaction of the interior threads 61 on the rotating adjustment ring 60 and exterior threads 45 on the stationary lens holder 40.

Since the circumferential projections 55 of the sliding lens holder 50 are slidably engaged in the circumferential groove 62 on the interior of the rotating adjustment ring 60, rotation of the rotating adjustment ring 60 effects longitudinal motion of the sliding lens holder 50 with respect to the stationary lens holder 40. However, since the longitudinal projections 54 of the sliding lens holder 50 are longitudinally slidably received in the longitudinal grooves 44 of the stationary lens holder 40, the sliding lens holder 50 is constrained to move only longitudinally and cannot rotate with respect to the stationary lens holder 40. As a result, the cylindrical lens 53 may be adjusted longitudinally with respect to the plano-cylindrical lens 43 without altering the orientation of the respective radii of curvature of the lenses 43, 53.

The effect of changing the physical separation between the plano-cylindrical lens 43 and the cylindrical lens 53 may be seen schematically from FIGS. 5A through 5D. A light beam 70 of initially parallel rays entering the plano-cylindrical lens 43 is initially converged by the plano-cylindrical lens 43. The converging rays of the light beam 70 are then diverged or dispersed at varying angles by the cylindrical lens 53 depending upon the degree of separation between the plano-cylindrical lens 43 and the cylindrical lens 53. By adjusting the distance between the plano-cylindrical lens 43 and cylindrical lens 53, therefore, the angle of dispersion of the light beam 70 may be determined.

Figure 6A:
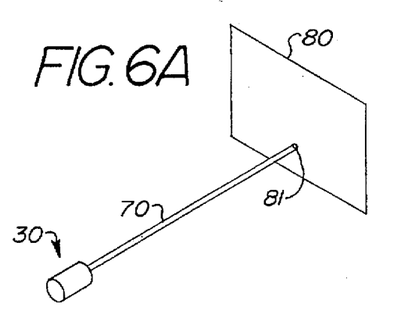
FIGS. 6A–6C are perspective views showing the effect of projecting a light beam focused to a dot (FIG. 6A), dispersing the light beam at an angle so as to project a line of finite length onto a surface (FIGS. 6B and 6C), and adjusting the focus of the light beam so as to vary the width of the projected line (FIG. 6B-wide focus and FIG. 6C-narrow focus).
Figure 6B:
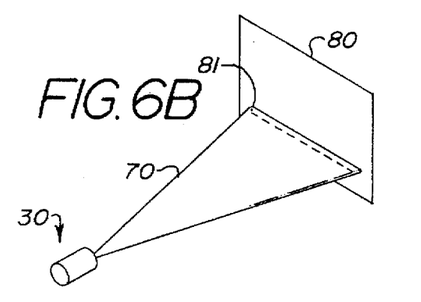
Figure 6C:
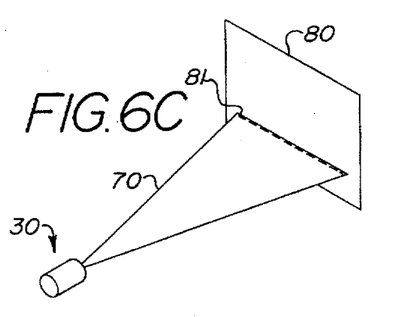

The effect of dispersing the light beam 70 at a given angle may be seen from FIGS. 6A through 6C and 11A though 11C. Projection of the beam 70 against a surface 80 at a given distance from the cylindrical lens holder 30 results in the formation of a projected line 81 of a determined length. As is shown in FIG. 6A, the projected line 81 may be essentially a dot or as shown in FIG. 6B may be dispersed into a line. FIG. 6B and 6C illustrate the effect of adjusting the focus of the light beam 70. A more tightly focused beam results in a projected line 81 of narrow thickness. A less tightly focused beam 70 results in a projected line 81 of greater thickness.

An alternative embodiment of the present invention may incorporate means to rotate the lens holder 30 so that the projected line may be set at various degrees of rotation from the horizontal or vertical, and in particular, may be locked in a horizontal or vertical position. Other options could include vertical and horizontal adjustment of the projected beam by various means known in the art. Such translatory or rotatory adjustments of the placement of the projected beam may be made without disturbing the set line length and width, and vice versa.

The present invention has been described with respect to certain preferred and alternative embodiments which are intended to be exemplary only and not limiting to the full scope of the invention as set forth in the appended claims.

What is claimed is:

1. A light beam line projecting device, comprising:
   (a) a first cylindrical lens having a first radius of curvature and a first axis of curvature associated therewith;
   (b) a second cylindrical lens having a second radius of curvature and a second axis of curvature associated therewith, said second axis of curvature being coplanar with said first axis of curvature;
   (c) separation adjusting means for setting a distance of separation between said first cylindrical lens and said second cylindrical lens; and
   (d) a light source aligned to project a light beam through said first cylindrical lens and said second cylindrical lens whereby said light beam is projected at an angle of dispersion so as to effect a projected line of determined length at a given distance; wherein said separation adjusting means comprises:
   (e) a stationary lens holder holding said first cylindrical lens and having exterior longitudinal grooves and exterior threads;
   (f) a sliding lens holder holding said second cylindrical lens and having longitudinal projections slidably engaging said longitudinal grooves and further having circumferential projections;
   (g) a rotating adjustment ring having an interior circumferential groove slidably engaging said circumferential projections of said sliding lens holder, said rotating adjustment ring being rotatable about said sliding lens holder and further having interior threads for threadedly receiving said exterior threads of said stationary lens holder whereby rotation of said rotating adjustment ring acts on said exterior threads of said stationary lens holder to effect sliding motion of said longitudinal projections of said sliding lens holder along said longitudinal grooves of said stationary lens holder and thereby affecting an alteration of said distance between said first cylindrical lens and said second cylindrical lens while maintaining said first axis of curvature coplanar with said second axis of curvature.

2. The light beam line projecting device of claim 1 further comprising focusing means for varying the focus and thus the width of said light beam projected at a given distance.

3. The light beam line projecting device of claim 2, wherein said focusing means further comprises a focusing lens and means to prevent rotation of said focusing lens.

4. The light beam line projecting device of claim 3 further comprising means to set a rotational angle of projection of said projected line.

5. The light beam line projecting device of claim 4 wherein said light beam source is a laser.

6. A lens holder for adjusting the distance of separation between a first lens and a second lens while maintaining the rotational alignment between the first lens and the second lens, comprising:
   (a) a stationary lens holder holding the first lens and having exterior longitudinal grooves and exterior threads;
   (b) a sliding lens holder holding the second lens and having longitudinal projections slidably engaging said longitudinal grooves and further having circumferential projections;
   (c) a rotating adjustment ring having an interior circumferential groove slidably engaging said circumferential projections of said sliding lens holder, said rotating adjustment ring being rotatable about said sliding lens holder and further having interior threads for threadedly receiving said exterior threads of said stationary lens holder whereby rotation of said rotating adjustment ring acts on said exterior threads of said stationary lens holder to effect sliding motion of said longitudinal projections of said sliding lens holder along said longitudinal grooves of said stationary lens holder and thereby affecting an alteration of said distance between the first lens and the second lens while maintaining the rotational alignment between the first lens and the second lens.

* * * * *